United States Patent [19]
Courty et al.

[11] Patent Number: 4,742,184
[45] Date of Patent: May 3, 1988

[54] CONNECTOR WITH EXTERNAL PROTECTION INTERCONNECTING TWO INSULATED ELECTRIC CABLES AND FORMING A JUNCTION THEREBETWEEN

[75] Inventors: Jean-Louis R. M. Courty, Danmartin en Goele; Philippe C. A. David, La Varenne, both of France

[73] Assignee: Treficable Pirelli, Saint-Maurice, France

[21] Appl. No.: 54,602

[22] Filed: May 27, 1987

[51] Int. Cl.⁴ .......................................... H02G 15/188
[52] U.S. Cl. ..................................... 174/73 R; 174/78; 174/88 C; 174/93
[58] Field of Search ................... 174/73 R, 73 SC, 78, 174/88 C, 93

[56] References Cited

U.S. PATENT DOCUMENTS

| | | | |
|---|---|---|---|
| 3,777,050 | 12/1973 | Silva | 174/78 |
| 4,314,093 | 2/1982 | Eldridge et al. | 174/73 R |
| 4,383,131 | 5/1983 | Clabburn | 174/73 R |

FOREIGN PATENT DOCUMENTS 80162 12/1979 Luxembourg ...................... 174/73 R Primary Examiner—Laramie E. Askin
Attorney, Agent, or Firm—Brooks Haidt Haffner & Delahunty

[57] ABSTRACT

A junction between a pair of insulated electric cables each with a peripheral conducting screen and a protective sheath over the screen is formed by a connector which includes a junction body composed of a tubular body of insulation with tapered ends and with internal and external semiconductive layers, a conductive material, such as a metal braid or ribbon, covering the external semiconductive layer and extending beyond the ends of the tubular body and connected at its ends to the screens of the cables, and an insulating protective tube with flanges at its ends that covers most of the tubular body and the conductive material thereon. A pair of tubular caps having a snap fit at one end thereof with the flanges on the protective tube and extending over the respective cable sheaths complete the connector. The junction body composed of the tubular body of insulation with the internal and external semiconductive layers, the conductive material, and the insulating protective tube may be formed as a preassembled unit.

9 Claims, 1 Drawing Sheet

CONNECTOR WITH EXTERNAL PROTECTION INTERCONNECTING TWO INSULATED ELECTRIC CABLES AND FORMING A JUNCTION THEREBETWEEN

The invention relates to a junction between two insulated electric cables, particularly medium voltage cables, and especially to a connector which connects the cables together to form the junction and which includes improved means for the external protection of the junction.

A connector for connecting together two insulated electric cables includes, in a way known per se, means for connecting together the conducting cores of the cables, means for connecting together their respective insulating layers, and possibly means for connecting together their conducting screens when these cables possess them.

One of the problems raised by the use of such a connector is providing means for the external protection thereof so as to obtain proper sealing of the junction between the cables, and if the cables have conducting screens, the mechanical protection of the means connecting together the conducting screens. Since the diameter of the connector is substantially larger than that of the cables, it is difficult to provide protection means in the form of a one piece protection sleeve which can be firmly applied both to the connector and to the cables adjacent to the ends of the connector.

In accordance with the known techniques, independent protection and sealing sleeves are therefore provided for the ends of the cables adjacent to the ends of the connector, and possibly a complementary protection sleeve for the connector also as is provided, which is a time wasting, costly operation and which correspondingly increases the risks of failure.

Another problem raised is the accurate positioning of such protection sleeves over the junction. At the present time, such sleeves are mounted manually and in an approximative way over the junction.

One of the objects of the invention is to provide a connector for connecting together two insulated electric cables to form a junction which includes means for the external protection of the junction that can be assembled together in a simple manner and that will provide continuity of protection from the joined end of one of the cables to the joined end of the other cable.

Another object of the invention is to provide a connector that includes a junction body which allows such external protection means to be readily obtained and which provides accurate positioning thereof.

In accordance with the invention, a connector for connecting together two insulated electric cables, each having at least one conducting core, a layer for insulating this core, a peripheral conducting screen and a protective sheath for this conducting screen, includes means for connecting said conducting cores together, means for connecting said insulating layers together and means for connecting said conducting screens together, and is characterized in that it further includes an envelope for protecting said means for connecting the conducting screens together as well as two protective caps which are fitted respectively at the ends of the two cables and which are sealingly applied to said protective sheaths, said protective envelope and said protective caps including sealed mutual snap fit means.

Advantageously, said protective envelope and said protective caps are made from a resilient material and are force fitted, respectively, on said means for connecting the conducting screens together and on said protective sheaths.

In a preferred embodiment, said snap fit means includes a peripheral groove on the protective caps and a peripheral flange on the protective envelope which is housed in said peripheral groove.

As an aid, the means for connecting said conducting screens together may include a metal braid which surrounds said means for connecting the insulating layers together and whose ends are turned back on these connecting means so as to be held between them and said protective envelope.

Furthermore, each said protective cap may include an opening formed in its lateral wall, the surface defining said opening being sealingly applied to a ground conductor which passes through said opening and which is connected to the conducting screen of the corresponding cable.

The invention also relates to a junction body forming part of the connector and which includes a tubular body having at least one insulating layer, a conducting screen surrounding said tubular body and extending from both ends thereof, and a protective envelope which covers said conducting screen except for the ends thereof and which has on its outer surface and at both its ends snap fit sealing means for the protective caps.

Preferably, said protective envelope is made from a resilient material and is force fitted on said conducting screen.

Advantageously, said conducting screen includes a metal braid whose two ends are bent back on said tubular body and are held between it and said protective envelope.

The tubular body may include an insulating layer interposed between two semiconducting layers.

Other objects and advantages of the present invention will be apparent from the following detailed description of the presently preferred embodiments thereof, which description should be considered in conjunction with the accompanying drawings in which.

Figure 1:
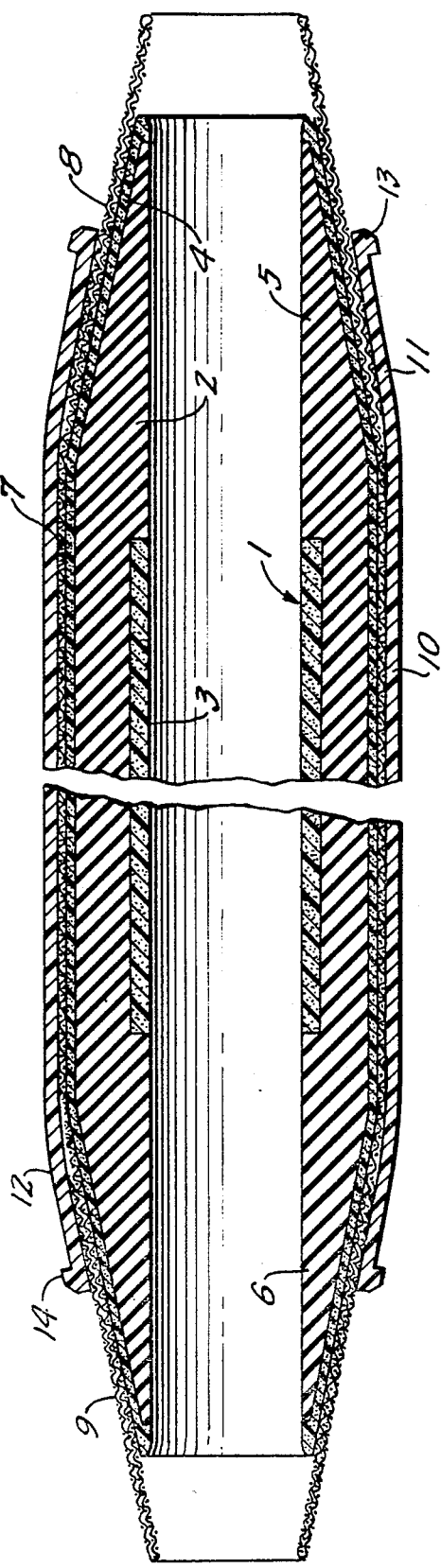
FIG. 1 is a longitudinal sectional view of a junction body of the invention.

The junction body of FIG. 1 includes a tubular body 1 which is formed, in a way known per se, of a main insulating layer 2 interposed between an internal semiconducting layer 3 and an external semiconducting layer 4. The tubular body 1 is in the form of a circular tube the two ends 5, 6 of which have an external tapered shape so as to have a progressively reduced section.

A metal screen, in the form of a tubular braid 7, covers externally the tubular body 1 and extends beyond the ends 5, 6 of the tubular body. However, the braid 7 is bent back on the tubular body 1, so that its ends 8, 9 bear on the tapered ends 5, 6 thereof.

A protective envelope in the form of a protective elastomer tube 10 overlies the tubular body 1 and the braid 7 and is force fitted thereon so as to maintain braid 7 in position on the tubular body 1. The protective tube 10 does not extend over the whole length of tubular body 1. The ends 11, 12 of the tube 10 are situated in line with a median zone of the tapering ends 5, 6 of tubular body 1. Each end 11, 12 of the protective tube 10 includes a circular flange 13, 14 extending radially outwardly.

In a variant of the embodiment shown in FIG. 1, the metal screen 7 may be formed by a metal ribbon. The protective tube 10 is generally resilient, thermoshrinkable or mechanically retractable. It may, however, be made from a rigid material such as a rigid plastic material if it is applied by molding.

Preferably, the junction body of FIG. 1 is preassembled in the factory before being used on the site. The protective elastomer tube 10 of FIG. 1 is, for example, mounted on tubular body 1 by means of a cylindrical vacuum tube. After introducing the protective tube 10 in this tube, a vacuum is formed so as to cause expansion of the tube 10. Then, the tubular body 1 with the braid 7 is disposed inside the protective tube 10, and then, the vacuum is released which causes retraction of the tube 10 on the braid 7 and the tubular body 1.

In a simpler assembly method, a lubricating bonding agent is applied to the outer surface of tubular body 1 and the braid 7, and the protective elastomer tube 10 is slid onto tubular body 1 and the braid 7 structure.

It will be noted that braid 7 and the protective tube 10 may thus be accurately positioned using mechanical means, which will facilitate assembly of the junction body on the site.

Figure 2:
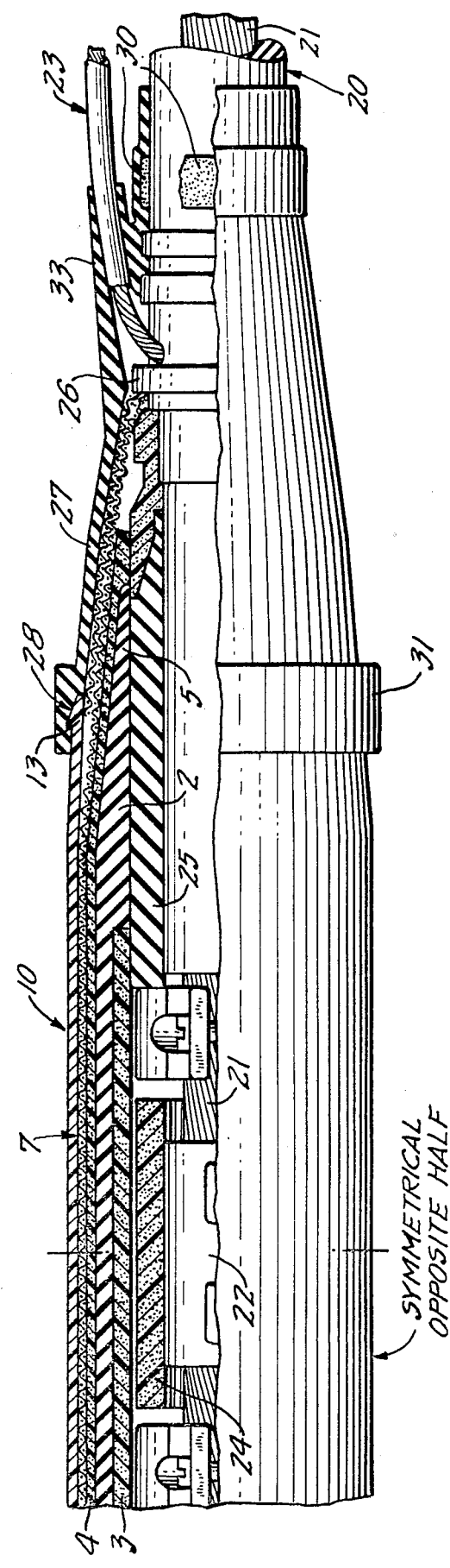
FIG. 2 is a half view, in partial longitudinal section of a cable junction using the junction body of FIG. 1.

FIG. 2 shows the junction body of FIG. 1 forming part of a symmetrical junction between two cables, only one, 20, of which is visible in this Fig. The description of the junction will therefore be limited to the part visible in FIG. 2, this description also applying to the symmetrical part not shown.

In a way known per se, the core 21 of the cable 20 is joined to that of the other cable by means of a connecting sleeve 22. An insulated grounding conductor 23 is connected to the metal screen of cable 20.

The junction body, which includes the internal semiconducting layer 3, the insulating layer 2, the external semiconducting layer 4, braid 7 and the protective tube 10, covers most of the junction area but not the grounding conductor 23. The insulating layer 2 and the semiconducting layers 3 and 4 of the junction body are, in a way known per se, engaged with the corresponding layers of the cable 20, with the interpositioning, in this example, of an elastomeric semiconductive split tube 24 and a tube 25 of elastomeric insulation for matching the inner diameter of the junction body to the outer diameter of cable 20.

The braid 7 is connected to the metal screen of cable 20 by means of a collar 26. A protective cap in the form of a tubular cap 27 covers the end of cable 20 and the tapered end 5 of the tubular body 1. The tubular cap 27 is made from elastomer. It has itself a widened tapered end which includes a circular fillet 31 inside which is formed a circular groove 28. Groove 28 snap fits sealingly onto the circular flange 13 of the protective tube 10 of the junction body. The other end of the tubular cap 27 is applied to the sheath of the cable 20 with interpositioning of a sealing mastic 30. The ground conductor 23 extends laterally from the tubular cap 27, passes through a tubular projection 33 on the cap and extends outwardly thereof. The inner surface of this tubular projection 33 is applied sealingly to the ground conductor 23.

In a simplified embodiment, the sealing mastic 30 may be omitted, the tubular cap 27 being force fitted to the sheath of the cable 20 and itself providing sealing.

During assembly of the junction on the work site, the junction body, preferably assembled in the factory, and the tube 25 are slid over one of the cables, e.g. the cable 20, after the tubular cap 27 has itself been positioned on the cable. A tubular cap, like the cap 27, is also placed on the other cable. After connection of the cores of the cables with the sleeve 22, the split tube 24 is placed over the sleeve 22, and the tube 25 is slid into the position shown in FIG. 2. The junction body is then brought over the junction area, and the tubular caps are then engaged in their turn and snap fitted onto the protective tube 10 of the junction body. If the sealing mastic 30 is used, it is applied before the tubular caps are positioned.

The relative positioning of the different components of the junction is controlled by the configuration of the components. The braid 7 and the protective tube 10 are already mounted on the tubular body 1 and are, therefore, properly positioned. As for the tubular caps, they are positioned accurately by means of the flanges 13, 14 of the protective tube 10 over which they snap fit.

From the joined end of one cable to the joined end of the other cable, the protection formed by the two tubular caps 27 and by the protective tube 10 is continuous.

It will be apparent that the mutual snap fit means between the tubular caps 27 and protective tube 10 is not limited to the specific form described and may assume different forms provided that the connection obtained is sealed over the whole periphery of the junction.

The invention finds its application more particularly in the construction of underground electric cable junctions, at medium voltage.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A junction between electric cables, comprising: two electric cables, each cable comprising at least one conducting core, insulation around the core, a conducting screen around the insulation and a protective sheath around said conducting screen, and a connector interconnecting said cables, said connector including,
   first conductive means conductively interconnecting the core of one of said cables with the core of the other of said cables;
   insulation means around said conductive means and extending from the insulation of one of said cables to the insulation of the other of said cables;
   second conductive means around said insulation means and conductively interconnecting the conducting screen of one of said cables with the conducting screen of the other of said cables;
   a protective tubular envelope of insulation around said second conductive means; and
   a pair of tubular caps of insulation, one of said tubular caps extending around the protective sheath of one of said cables and to one end of said protective tubular envelope and the other of said tubular caps extending around the protective sheath of the other of said cables and to the other end of said protective tubular envelope, said tubular caps and said protective tubular envelope having snap fit means at their adjacent ends for sealing and mechanically interconnecting said tubular caps with said protective tubular envelope.

2. A junction as set forth in claim 1 wherein said protective tubular envelope and said tubular caps are made of resilient material, said protective tubular envelope is stretched around said second conductive means and said tubular caps are stretched around the respective protective sheaths, whereby said protective tubular envelope presses against said second conductive means and said tubular caps press against the respective protective sheaths.

3. A junction as set forth in claim 1 wherein said snap fit means comprises a peripheral flange on one of said tubular caps and said protective tubular envelope and a peripheral groove on the other of said tubular caps and said protective tubular envelope receiving said peripheral flange.

4. A junction as set forth in claim 1 wherein said second conductive means is a tubular metal braid with the ends thereof bent back upon a portion of the braid and disposed intermediate said protective tubular envelope and said insulation means.

5. A junction as set forth in claim 1 further comprising a pair of conductors, one of said conductors extending through and engaging the sidewall of one of said pair of tubular caps and conductively connected to the conducting screen of the cable within said one of said pair of tubular caps and the other of said conductors extending through and engaging the sidewall of the other of said pair of tubular caps and conductively connected to the conducting screen of the cable within said other of said pair of tubular caps.

6. A junction body for use in forming a junction between a pair of electric cables, said body comprising:
- a tubular body having at least a layer of insulation;
- a conductive screen around said tubular body, said conductive screen having an axial length greater than the axial length of said tubular body;
- a protective tubular envelope of insulation around and covering said conductive screen except for portions thereof at axially opposite ends thereof, said protective tubular envelope having cap engaging portions at its axially opposite ends of a diameter different from the portions of said envelope adjacent to said cap engaging portions.

7. A junction body as set forth in claim 6 wherein said protective tubular envelope is made of a resilient material and is stretched around said conductive screen whereby said protective tubular envelope presses against said conductive screen.

8. A junction body as set forth in claim 6 wherein said conductive screen is a tubular metal braid with the ends thereof bent back upon a portion of the braid and disposed intermediate said protective tubular envelope and said tubular body.

9. A junction body as set forth in claim 6 wherein said tubular body further comprises a pair of layers of semi-conductive material, one at the exterior surface thereof and one at the interior surface thereof.

* * * * *